(12) United States Patent
Bodey

(10) Patent No.: US 12,741,698 B2
(45) Date of Patent: Sep. 22, 2026

(54) HARDPOINT CONNECTORS FOR COMPOSITE TRUCK BODY FLOORS

(71) Applicant: Wabash National, L.P., Lafayette, IN (US)

(72) Inventor: Michael Bodey, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 237 days.

(21) Appl. No.: 18/768,127

(22) Filed: Jul. 10, 2024

(65) Prior Publication Data

US 2025/0019007 A1 Jan. 16, 2025

Related U.S. Application Data

(60) Provisional application No. 63/526,492, filed on Jul. 13, 2023.

(51) Int. Cl.

| | |
|---|---|
| ***B62D 25/00*** | (2006.01) |
| ***B62D 25/20*** | (2006.01) |
| ***B62D 27/02*** | (2006.01) |

(52) U.S. Cl.
CPC ....... *B62D 25/2054* (2013.01); *B62D 27/026* (2013.01)

(58) Field of Classification Search
CPC .......................... B62D 25/2054; B62D 27/026
USPC ...................................................... 296/184.1
See application file for complete search history.

(56) References Cited

U.S. PATENT DOCUMENTS

| | | | |
|---|---|---|---|
| 8,186,747 | B2 | 5/2012 | Bloodworth et al. |
| 11,358,652 | B2 | 6/2022 | Storz et al. |

*Primary Examiner* — Steven O Douglas
(74) *Attorney, Agent, or Firm* — Faegre Drinker Biddle & Reath LLP

(57) ABSTRACT

A cargo vehicle includes a chassis having a longitudinal rail coupled to a motorized truck. A cargo body is coupled to the chassis and includes a floor for supporting cargo. A hardpoint connector couples the longitudinal rail of the chassis to the floor of the cargo body. The hardpoint connector includes a base, a neck coupled to the base, and a head coupled to the neck opposite the base. The head is embedded in the floor of the cargo body. The hardpoint connector further includes a first leg coupled to the base and extending opposite the neck, and a second leg coupled to the base and extending opposite the neck.

25 Claims, 9 Drawing Sheets

162
150
144
152
148
146

HARDPOINT CONNECTORS FOR COMPOSITE TRUCK BODY FLOORS

CROSS-REFERENCE TO RELATED APPLICATION

The present application claims the benefit of U.S. Provisional Application No. 63/526,492, entitled "HARDPOINT CONNECTORS FOR COMPOSITE TRUCK BODY FLOORS," filed on Jul. 13, 2023, which is incorporated by reference herein for all purposes in its entirety.

FIELD OF THE DISCLOSURE

The present disclosure relates to a hardpoint connectors for coupling a composite floor of a cargo vehicle to a chassis of the cargo vehicle.

BACKGROUND OF THE DISCLOSURE

Vehicles having cargo bodies are used in the transportation industry for transporting many different types of cargo. Certain cargo bodies may be refrigerated and insulated to transport temperature-sensitive cargo. The use of metal components within the floor, roof, sidewalls, and/or nose of the cargo body may contribute to heat loss from the interior of the cargo body and/or higher overall weight of the truck body. In order to reduce heat loss and the overall weight of the truck body, some cargo bodies are now being made of composite materials. However, coupling the composite materials to a chassis of the cargo vehicle has proven to be difficult, because present mounting apparatuses are generally complex and difficult to install. Thus, a need exists for a mounting apparatus for coupling the cargo body of a vehicle to the chassis of the vehicle that is relatively simple and easy to install.

SUMMARY OF THE DISCLOSURE

A hardpoint connector is disclosed for coupling a chassis rail of a cargo vehicle to a composite floor of the cargo vehicle.

According to an exemplary embodiment of the present disclosure, a cargo vehicle includes a chassis including a longitudinal rail coupled to a motorized truck. A cargo body is coupled to the chassis and includes a floor for supporting cargo. A hardpoint connector couples the longitudinal rail of the chassis to the floor of the cargo body. The hardpoint connector includes a base, a neck coupled to the base, and a head coupled to the neck opposite the base, the head being embedded in the floor of the cargo body. The hardpoint connector further includes a first leg coupled to the base and extending opposite the neck, and a second leg coupled to the base and extending opposite the neck.

In certain embodiments, the floor of the cargo body includes a lower cavity, wherein the head of the hardpoint connector is disposed in the lower cavity of the floor, and further including an adhesive disposed in the lower cavity of the floor and coupling the floor to the head of the hardpoint connector.

In certain embodiments, the hardpoint connector receives the longitudinal rail between the first leg and the second leg.

In certain embodiments, the head of the hardpoint connector includes a circular disk shape.

In certain embodiments, the base of the hardpoint connector includes a circular disk shape.

In certain embodiments, the head of the hardpoint connector includes a circular disk shape.

In certain embodiments, the head of the hardpoint connector includes a first diameter, the base includes a second diameter, the second diameter being greater than the first diameter.

In certain embodiments, the base, the first leg, and the second leg of the hardpoint connector define an inverted U-shape when view from a side of the hardpoint connector.

In certain embodiments, the cargo vehicle further includes a fastener received by and coupling the first leg and the second leg of the hardpoint connector to the longitudinal rail of the chassis In certain embodiments, the first leg of the hardpoint connector includes a first leg aperture receiving the fastener, and the second leg of the hardpoint connector includes a second leg aperture receiving the fastener.

In certain embodiments, the base of the hardpoint connector includes a base aperture, and further including an adhesive disposed in the base aperture.

In certain embodiments, the hardpoint connector is a first hardpoint connector, and further including a second hardpoint connector coupling the longitudinal rail of the chassis to the floor of the cargo body.

In certain embodiments, the longitudinal rail of the chassis is a first longitudinal rail, the chassis further includes a second longitudinal rail, the hardpoint connector is a first hardpoint connector, and further including a second hardpoint connector coupling the second longitudinal rail of the chassis to the floor of the cargo body.

According to another exemplary embodiment of the present disclosure, a cargo vehicle includes a chassis coupled to a motorized truck and having a longitudinal rail. A cargo body is coupled to the chassis and includes a floor for supporting cargo, and a hardpoint connector couples the longitudinal rail of the chassis to the floor of the cargo body. The hardpoint connector includes an inverted U-bolt portion coupled to the longitudinal rail of the chassis, and a stationary capstan portion coupled to the floor of the cargo body.

In certain embodiments, the cargo vehicle further includes a fastener received by and coupling the inverted U-bolt portion of the hardpoint connector to the longitudinal rail of the chassis.

In certain embodiments, the floor of the cargo body includes a lower cavity, the stationary capstan portion of the hardpoint connector is disposed in the lower cavity of the floor, and the cargo vehicle further includes an adhesive disposed in the lower cavity of the floor and coupling the floor to the stationary capstan portion of the hardpoint connector.

In certain embodiments, the inverted U-bolt portion of the hardpoint connector includes a first leg and a second leg, and the hardpoint connector receives the longitudinal rail between the first leg and the second leg.

In certain embodiments, the stationary capstan portion of the hardpoint connector includes head, the head including a circular disk shape.

In certain embodiments, the inverted U-bolt portion of the hardpoint connector includes a base, the base includes a circular disk shape.

In certain embodiments, the stationary capstan portion of the hardpoint connector includes head, the head including a circular disk shape.

In certain embodiments, the head of the hardpoint connector includes a first diameter, the base includes a second diameter, the second diameter being greater than the first diameter.

According to yet another exemplary embodiment of the present disclosure, a method for coupling a chassis rail of a vehicle to a lower surface of a composite floor of a cargo body of the vehicle includes; providing a hardpoint connector, the hardpoint connector including a base, a neck coupled to the base, a head coupled to the neck opposite the base, a first leg coupled to the base and extending opposite the neck, and a second leg coupled to the base and extending opposite the neck; embedding the head of the hardpoint connector in the floor of the cargo body of the vehicle; and coupling the first leg and the second leg of the hardpoint connector to the chassis rail.

In certain embodiments, providing the hardpoint connector includes bending the first leg and the second leg of the hardpoint connector relative to the base of the hardpoint connector.

In certain embodiments, the method further includes forming the floor of the cargo body from a plurality of layers before embedding the head of the hardpoint connector in the floor of the cargo body of the vehicle.

In certain embodiments, the base of the hardpoint connector includes a base aperture and the floor of the cargo body includes a lower cavity, and embedding the head of the hardpoint connector in the floor of the cargo body of the vehicle includes injecting an adhesive through the base aperture and into the lower cavity.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
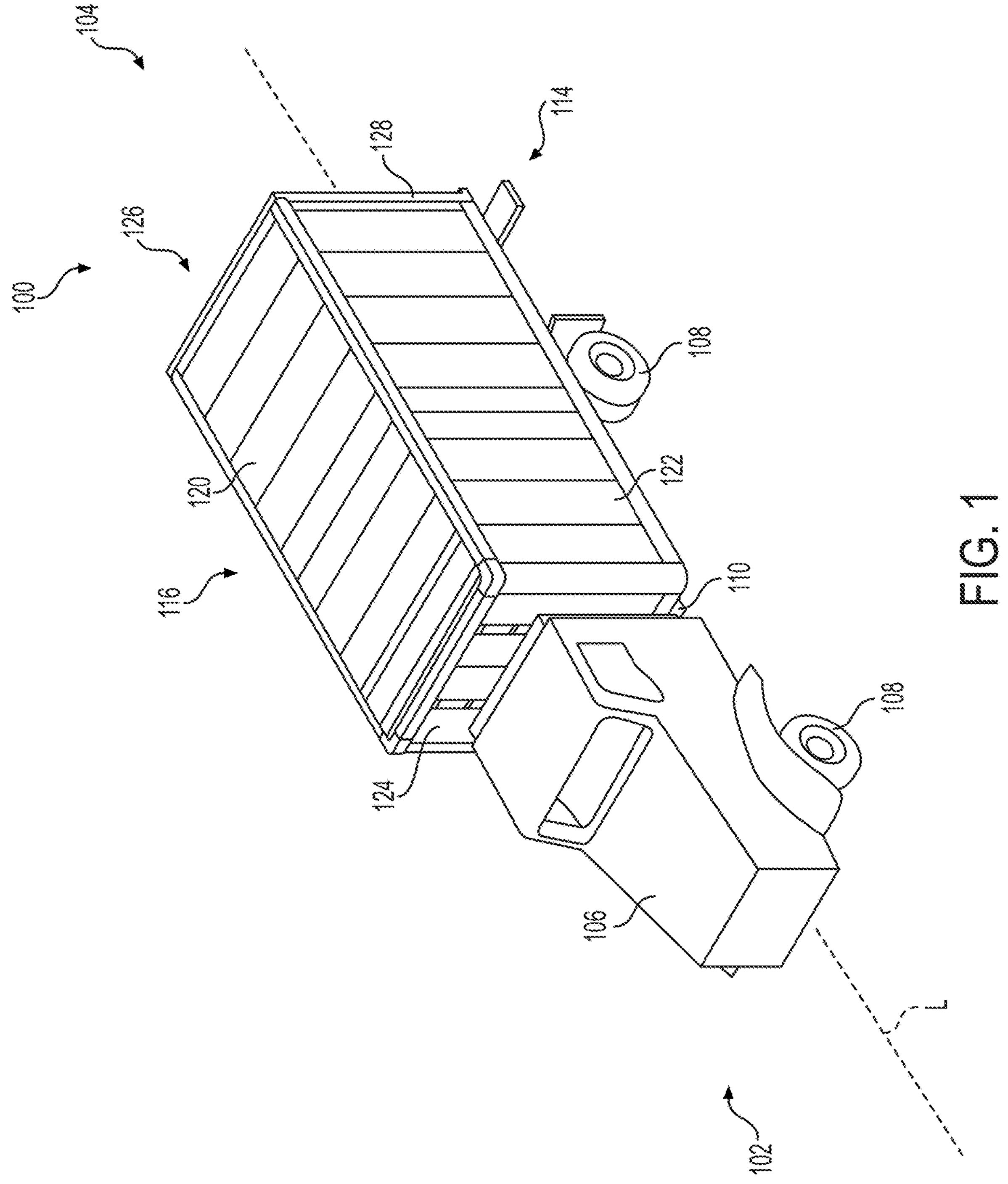
FIG. 1 is a top perspective view of a cargo vehicle including a motorized truck, a chassis, a plurality of wheels, a bumper assembly, and a cargo body, the cargo body including a floor, a roof, a right sidewall, a left sidewall, a nose, and a rear door assembly having a rear frame.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described herein. The embodiments disclosed herein are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 2:
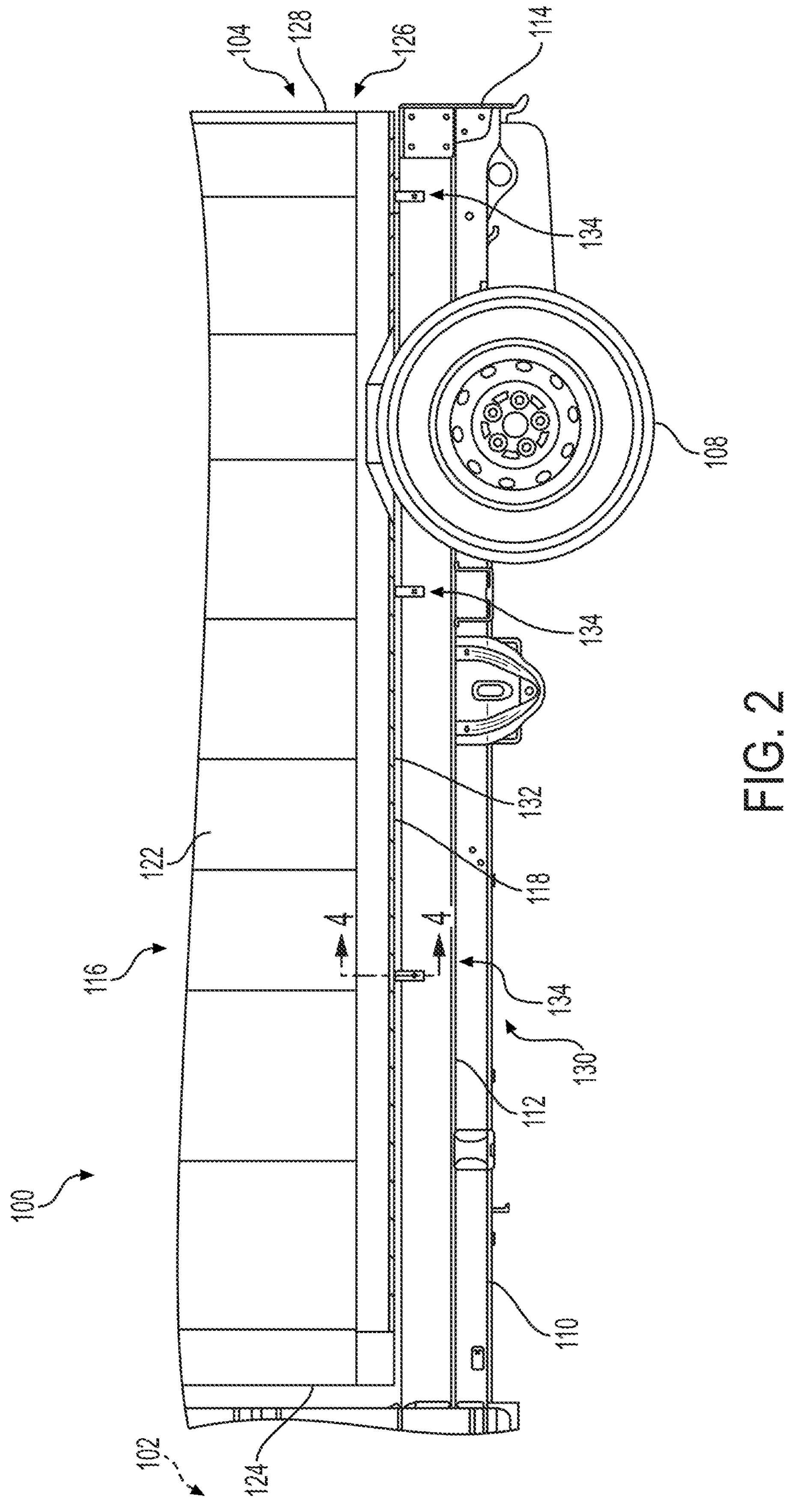
FIG. 2 is a partial side elevational view of the cargo vehicle of FIG. 1.
Figure 3:
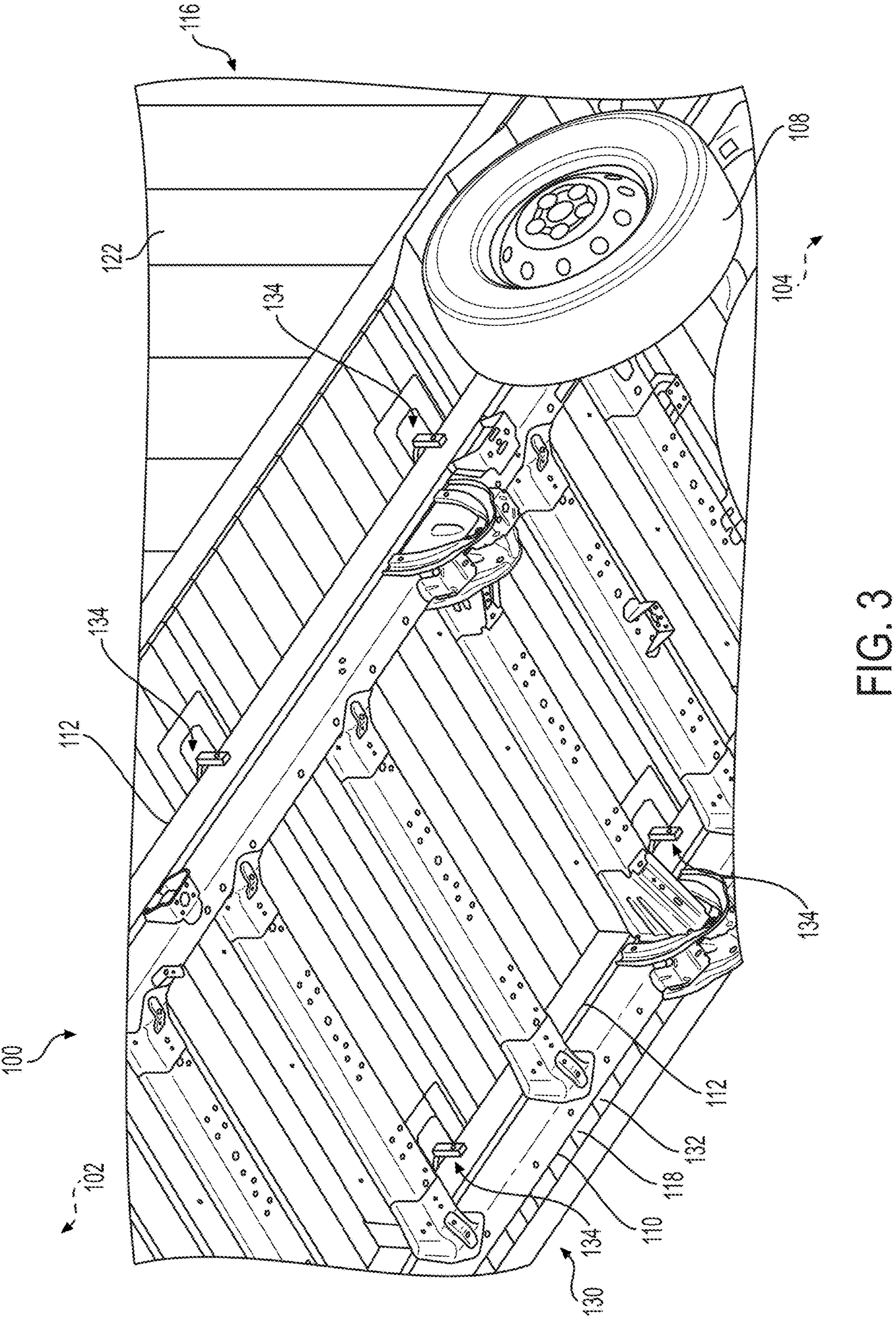
FIG. 3 is a partial bottom perspective view of the cargo vehicle of FIG. 1.

Referring initially to FIGS. 1-3, a cargo vehicle 100 is shown for supporting and transporting cargo. The illustrative vehicle 100 extends along a longitudinal axis L (FIG. 1) from a front end 102 to a rear end 104 and includes a motorized truck 106 (FIG. 1) that powers a plurality of wheels 108 or other traction devices. The vehicle 100 also includes a chassis 110 having right and left longitudinal rails 112. The vehicle 100 further includes a bumper assembly 114. The illustrative vehicle 100 still further includes a cargo body 116 including a floor 118 for supporting cargo, a roof 120, right and left sidewalls 122, a front wall or nose 124, and a rear door assembly 126 having a rear frame 128 and a door (not shown) to access the interior of the cargo body 116.

In the illustrated embodiment, the cargo body 116 is an enclosed body that is supported atop the chassis 110. The cargo body 116 may be refrigerated and/or insulated to transport temperature-sensitive cargo. However, it will be understood that the cargo body 116 may take other forms, such as those of conventional trailers (for example, dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

2. Composite Materials

The cargo body 116 may be constructed, at least in part, of composite materials. For example, the floor 118, the roof 120, the right and left sidewalls 122, and/or the nose 124 of the cargo body 116 may be constructed of composite materials. As such, the cargo body 116, as well as the floor 118, the roof 120, the right and left sidewalls 122, and/or the nose 124 of the cargo body 116, may be referred to herein as composite structures. These composite structures may lack internal metal components. Also, each composite structure may be a single, unitary component, which may be formed from a plurality of layers permanently coupled together. Other elements of the cargo body 116 may be constructed of non-composite (for example, metallic) materials. For example, the rear frame 128 of the cargo body 116 may be constructed of metallic materials.

The composite construction of the cargo body 116 may present certain advantages. First, because the composite structures may lack internal metal components, the composite cargo body 116 may have a reduced heat loss coefficient (Ua) and improved thermal efficiency. Also, the composite cargo body 116 may operate to minimize outgassing of blowing agents, minimize air loss, and minimize water intrusion. Additionally, the composite cargo body 116 may be lighter in weight than a typical metallic cargo body, which may improve fuel efficiency. Further, the composite cargo body 116 may have fewer metallic structures than a typical cargo body, which may make the cargo body 116 less susceptible to corrosion. Also, the composite cargo body 116 may include fewer parts than a typical metallic cargo body, which may simplify construction, reduce inventory, and reduce variation in manufacturing. Further, the composite cargo body 116 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 116 may qualify as "food grade" equipment.

Composite materials are generally formed by combining two or more different constituents that remain separate and distinct in the final composite material. Exemplary composite materials include fiber-reinforced plastics (FRP), for example carbon-fiber-reinforced plastics (CRP). Such materials may be formed from an extruded preform assembly of a woven or stitched fiberglass cloth, a non-woven spun bond polymeric material, and a foam core (not shown). These preforms may be cut to size, combined in a mold resembling the final shape with other fiberglass and resin layers, and wetted with at least one resin and optionally a catalyst to define a single structure during a curing process. The spun bond polymeric material may be mechanically stitched to the fiberglass cloth and/or the foam before the preforms are wetted with resin. In one embodiment, the spun bond material may be a polyester material, the foam may be a polyurethane material, and the resin may be a thermoset plastic resin matrix. An exemplary resin is the co-cure resin disclosed in U.S. Pat. No. 9,371,468, which is incorporated by reference in its entirety herein.

The individual preforms may be sized, shaped, and arranged in a manner that accommodates the strength requirements of the final structure. In areas of the final structure requiring less strength, the preforms may be relatively large in size, with the foam cores spanning relatively large distances before reaching the surrounding fiberglass and polymeric skins. By contrast, in areas of the final structure requiring more strength, the preforms may be relatively small in size, with the foam cores spanning relatively small distances before reaching the surrounding fiberglass and polymeric skins. For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

Exemplary composite structures include DuraPlate® structures provided by Wabash National Corporation of Lafayette, Indiana and PRISMA® structures provided by Compsys, Inc. of Melbourne, Florida. Such composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, 6,543,469, and 9,371,468 and 10,239,265.

3. Adhesive Bonding

Various connections or joints of the composite cargo body 116 may be assembled, at least in part, using adhesive bonding. The adhesive may be a structural adhesive that is suitable for load-bearing applications. The adhesive may have a lap shear strength greater than 1 MPa, 10 MPa, or more, for example. Exemplary adhesives include, for example, epoxies, acrylics, urethanes (single and two part), polyurethanes, methyl methacrylates (MMA), cyanoacrylates, anaerobics, phenolics, and/or vinyl acetates. The adhesive may be selected based on the needs of the particular application.

The method used to form an adhesive bond may also vary according to the needs of the particular application. First, the surfaces receiving the adhesive (that is, adherends) may be pre-treated, such as by abrading the surfaces, applying a primer, and/or cleaning the surfaces with a suitable cleaner (for example, denatured alcohol). Second, the adhesive may be applied to the surfaces over a predetermined application time (that is, "open" time) and at a predetermined application temperature. In certain embodiments, the application temperature may be below the glass-transition temperature of the adhesive. Third, pressure may be applied to the surfaces, such as by using clamps, weights, vacuum bags, and/or ratchet straps, for example. Finally, the adhesive may be allowed to solidify. Some adhesives may undergo a chemical reaction in order to solidify, referred to as curing. This curing may occur over a predetermined cure time and at a predetermined cure temperature. In certain embodiments, the adhesive may be heated during curing such that the cure temperature is higher than the application temperature.

Using adhesive bonding to assemble the composite cargo body 116 rather than mechanical fasteners may present certain advantages. First, the composite structures may not require holes for mechanical fasteners, so the structural integrity of the composite structures may be maintained.

Also, the adhesive bond may be stronger than a connection using mechanical fasteners. In fact, the strength of the adhesive bond may exceed the strength of the composite structures themselves, so the composite structures may delaminate or otherwise fail before the adhesive fails. Further, the elimination of mechanical fasteners may also provide improved aesthetics. Finally, the adhesive may form a seal between the adherends, which may help fill intentional or unintentional spaces between the adherends and insulate the cargo body 116.

4. Cargo Body Connectors

Various components of the composite cargo body 116 may be assembled using one or more connectors, which may include brackets, braces, plates, and combinations thereof, for example. The connectors may vary in size and shape. For example, suitable connectors may be L-shaped, C-shaped, T-shaped, pi-shaped, flat, or bent.

The connectors may be constructed of metallic materials (for example, aluminum, titanium, or steel), polymeric materials, wood, or composite materials. In certain embodiments, the connectors are constructed of materials which are dissimilar from the composite material used to construct the composite cargo body 116. The connectors may be fabricated by extrusion, pultrusion, sheet forming and welding, roll forming, and/or casting, for example.

The connectors may be adhesively bonded to composite structures of the cargo body 116. For example, the connectors may be adhesively bonded to the composite floor 118, the composite roof 120, the composite right and left sidewalls 150, and/or the composite nose 124 of the cargo body 116. The connectors may be mechanically fastened to non-composite (for example, metallic) structures of the cargo body 116. For example, the connectors may be mechanically fastened to the metallic rear frame 128 of the cargo body 116. Suitable mechanical fasteners include bolts, rivets, and screws, for example.

5. Connection between Composite Floor and Metallic Chassis

Referring specifically to FIGS. 2 and 3, a connection 130 is shown between the composite floor 118 of the cargo body 116 and the chassis 110 of the vehicle 100. The composite floor 118 of the cargo body 116 includes an upper surface (not shown) for supporting cargo, and an opposite lower surface 132. The chassis 110 includes the right and left longitudinal rails 112. A plurality of mounting assemblies 134 are provided along the length of the vehicle 100 (FIG. 2) to form the connection 130 between the composite floor 118 of the cargo body 116 and the rails 112 of the chassis 110. In the illustrated embodiment, the connection 130 includes six mounting assemblies 134 (three mounting assemblies being illustrated in FIG. 2 and four mounting assemblies being illustrated in FIG. 3). More specifically, three mounting assemblies 134 couple the cargo body 116 to the right longitudinal rail 112 and three mounting assemblies 134 couple the cargo body 116 to the left longitudinal rail 112. In other embodiments, the connection 130 may include a different number of mounting assemblies 134.

Figure 4:
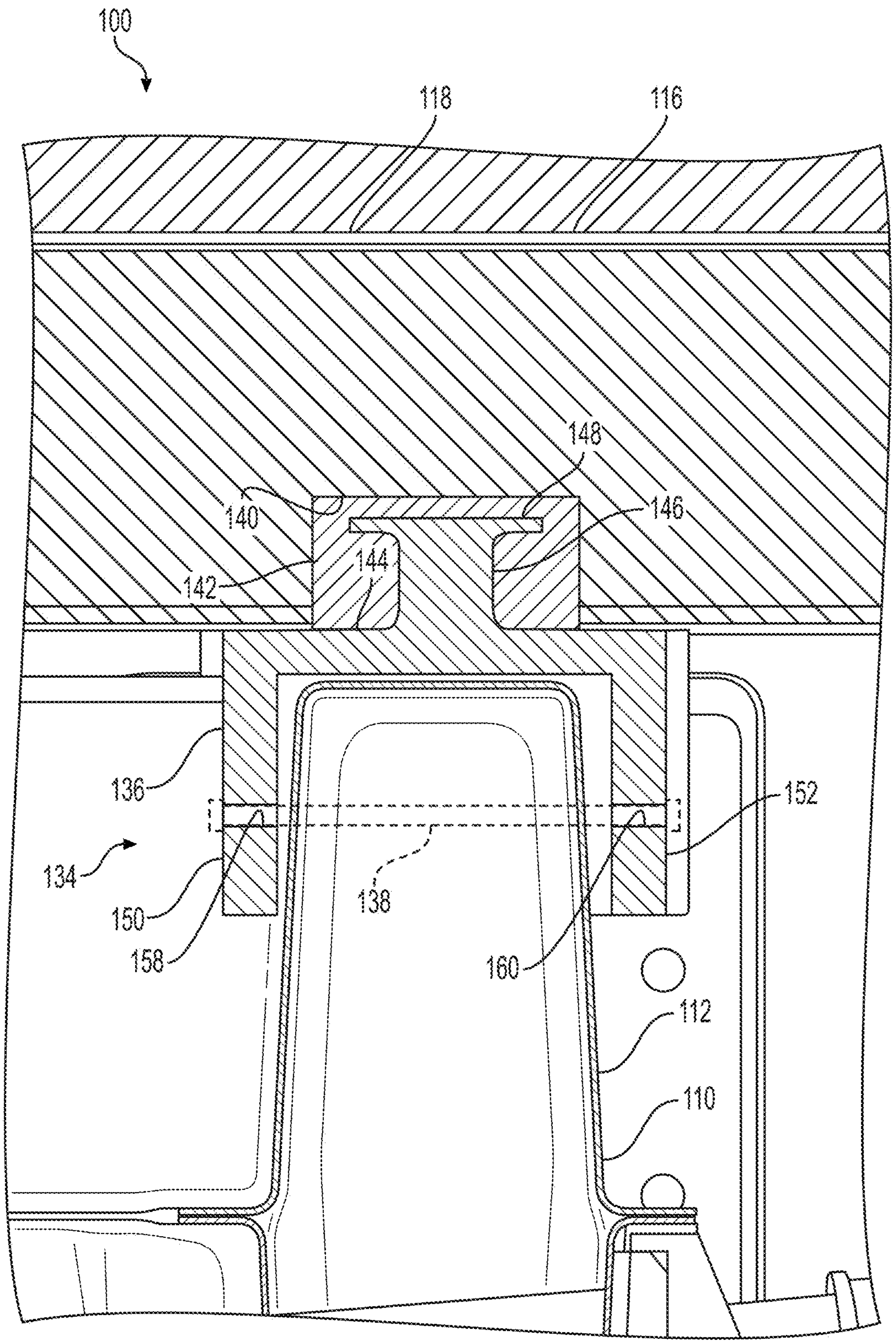
FIG. 4 is a sectional view of the cargo vehicle along line 4-4 of FIG. 2, illustrating a mounting assembly coupling the floor to the chassis.
Figure 5:
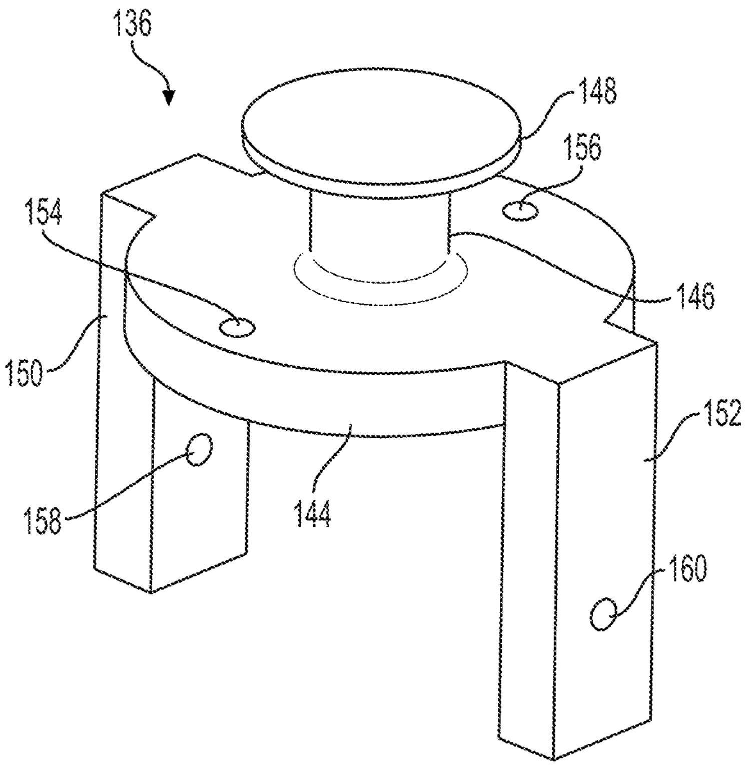
FIG. 5 is a top perspective view of a hardpoint connector of the mounting assembly of FIG. 4.
Figure 6:
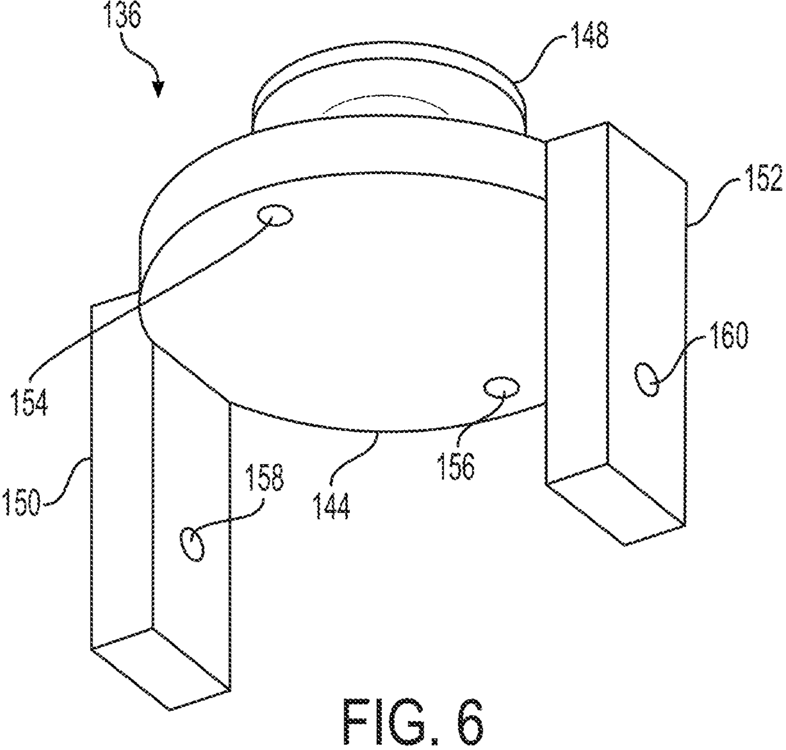
FIG. 6 is a bottom perspective view of hardpoint connector of FIG. 5.
Figure 7:
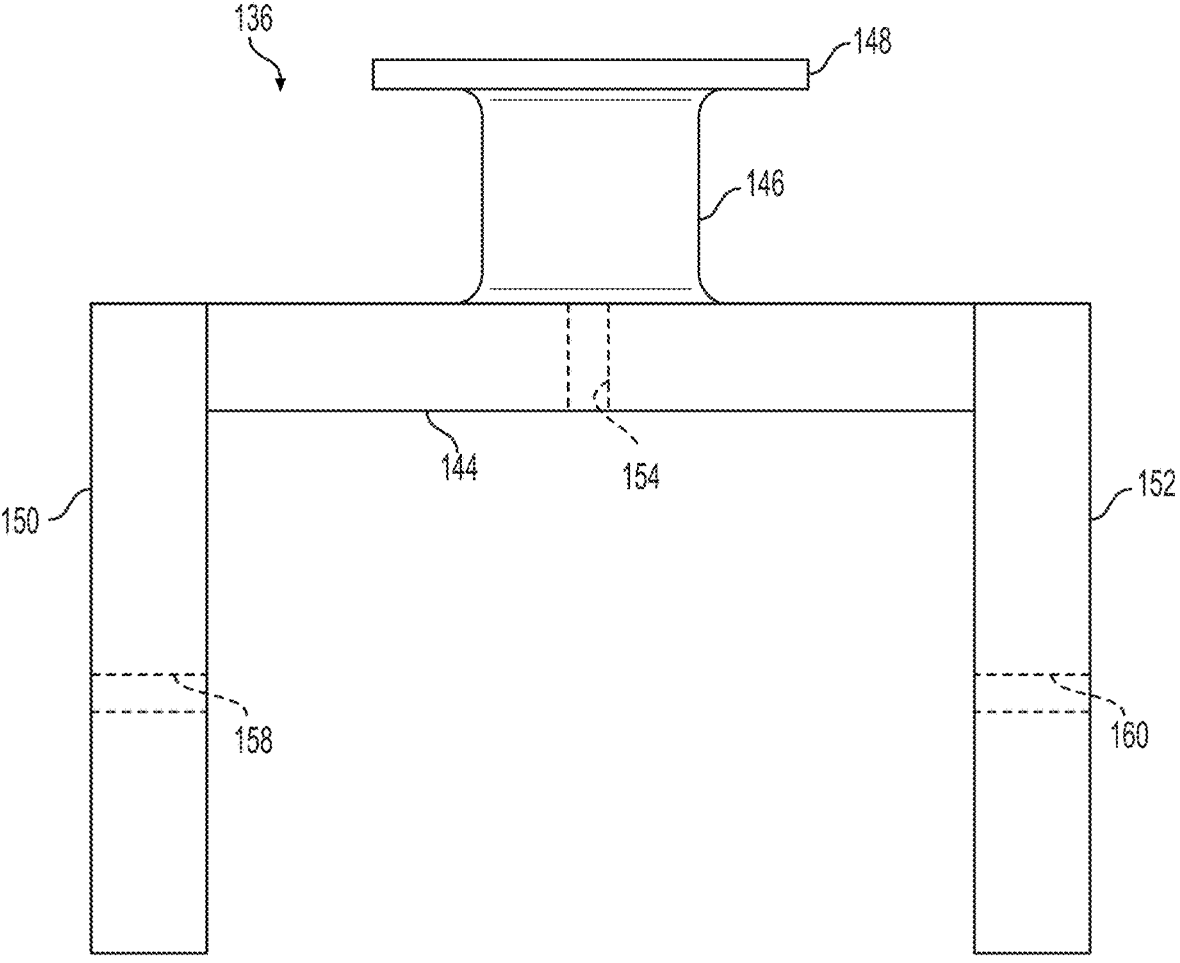
FIG. 7 is a front view of the hardpoint connector of FIG. 5.
Figure 8:
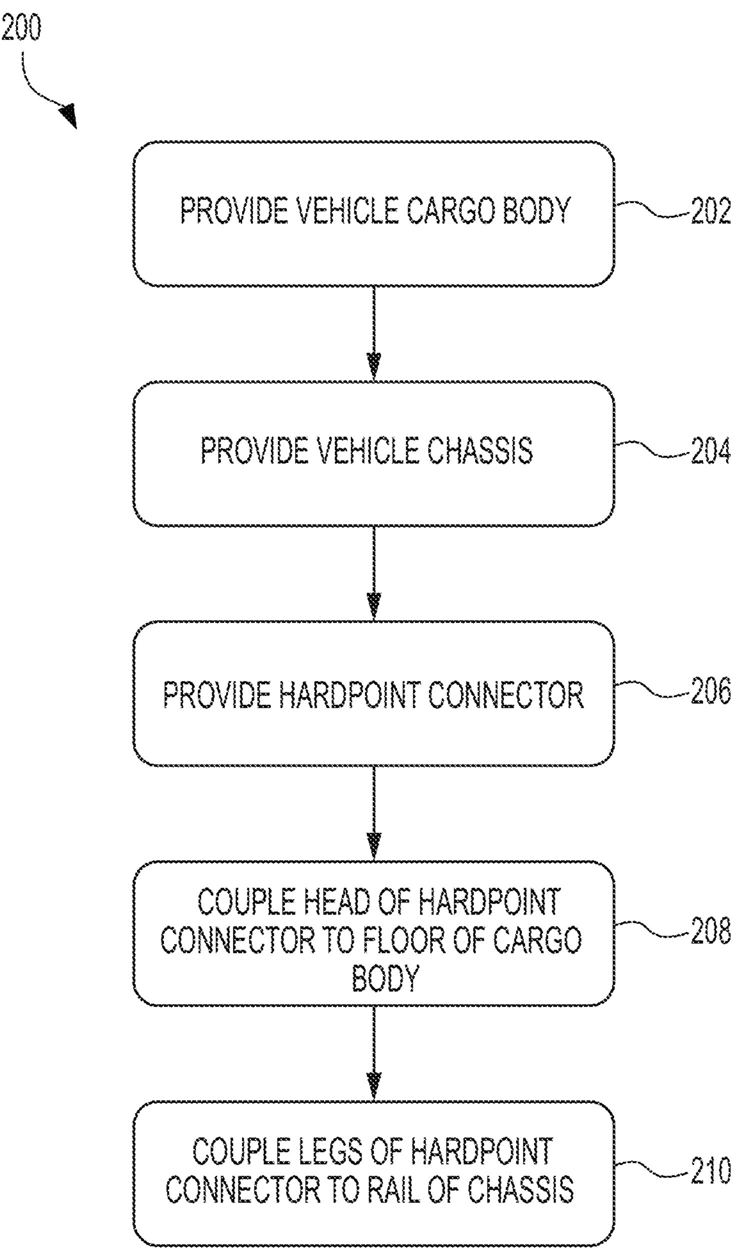
FIG. 8 is a flow diagram of a method for coupling a chassis rail of a vehicle to a floor of a cargo body of the vehicle.

Referring now to FIGS. 4-7, each mounting assembly 134 illustratively includes a hardpoint connector 136 (FIGS. 4-7) and a mechanical fastener 138 (FIG. 4; for example, a bolt, a screw, a rivet, or a nail). As described in further detail herein, the hardpoint connector 136 is partially embedded in the floor 118 of the cargo body 116 and coupled to the longitudinal rail 112 of the chassis 110 via the fastener 138.

Referring specifically to FIG. 4, the composite floor 118 includes a downwardly facing lower cavity 140, for each mounting assembly 134, in which the hardpoint connector 136 is partially disposed. An adhesive 142 is also disposed in the lower cavity 140 of the floor 118, and the adhesive 142 secures the hardpoint connector 136 to the floor 118. The hardpoint connector 136 is thereby partially embedded in the floor 118.

With reference again to FIGS. 4-7, the hardpoint connector 136 generally has an inverted wishbone-like shape. More specifically, the connector 136 includes a centrally positioned base 144, an upwardly extending neck 146 and head 148, a first downwardly extending leg 150, and a second downwardly extending leg 152 disposed apart from the first leg 150. The neck 146 and head 148 may also be referred to as a stationary capstan portion, due to their combined appearance. The base 144, the first leg 150, and the second leg 152 may also be referred to as an inverted U-bolt portion, due to their combined appearance.

As illustrated, the neck 146 may have a cylindrical shape, and the base 144 and the head 148 may both have circular disk shapes. The head 148 may have a first diameter, the base 144 may have a second diameter, and the second diameter may be greater than the first diameter. The first leg 150 and the second leg 152 may have elongated brick-like shapes.

The hardpoint connector 136 includes several apertures to facilitate coupling to the floor 118 and the chassis 110. More specifically, the base 144 includes a first base aperture 154 and a second base aperture 156 to facilitate injecting the adhesive 142 into the lower cavity 140 of the floor 118 (FIG. 4). The adhesive 142 may be injected into the first base aperture 154 and the second base aperture 156 may permit excess adhesive to exit the lower cavity 140. The first leg 150 includes a first leg aperture 158 and the second leg 152 includes a second leg aperture 160. The fastener 138 (FIG. 4) extends through both leg apertures 158, 160 and the chassis rail 112 to couple the hardpoint connector 136 to the chassis rail 112.

Referring specifically again to FIG. 4, the neck 146 and the head 148 of the hardpoint connector 136 are disposed in the lower cavity 140 of the floor 118, and the adhesive 142 in the lower cavity 140 couples the neck 146 and the head 148 to the floor 118. On the opposite end of the hardpoint connector 136, the first leg 150 and the second leg 152 receive the longitudinal rail 112 of the chassis 110 therebetween.

One or more of the base 144, the neck 146, the head 148, the first leg 150, and the second leg 152 may be monolithically constructed, or integrally formed, with one another. Accordingly, and as described in further detail herein, the connector 136 may be formed in a casting processes and comprise one or more metals. In other embodiments, the base 144, the neck 146, the head 148, the first leg 150, and the second leg 152 are not monolithically constructed, the connector 136 is formed in one or more different processes, and/or the connector 136 comprises one or more non-metallic materials.

Referring to FIGS. 8, 9A, 9B, and 9C, a method 200 for coupling a chassis rail of a vehicle to a composite floor of a cargo body of the vehicle is as follows. The description of the method 200 refers to the vehicle 100 and its components as illustrated in FIGS. 1-7 as an example, although it is understood that the method 200 could be used in connection with any of the vehicles contemplated herein.

The method 200 begins at block 202 by providing the cargo body 116 of the vehicle 100. More specifically, the cargo body 116 is provided with the composite floor 118 including a plurality of coupled layers and otherwise as described herein, except that the lower cavity 140 is empty.

Figures 9A, 9B, 9C:
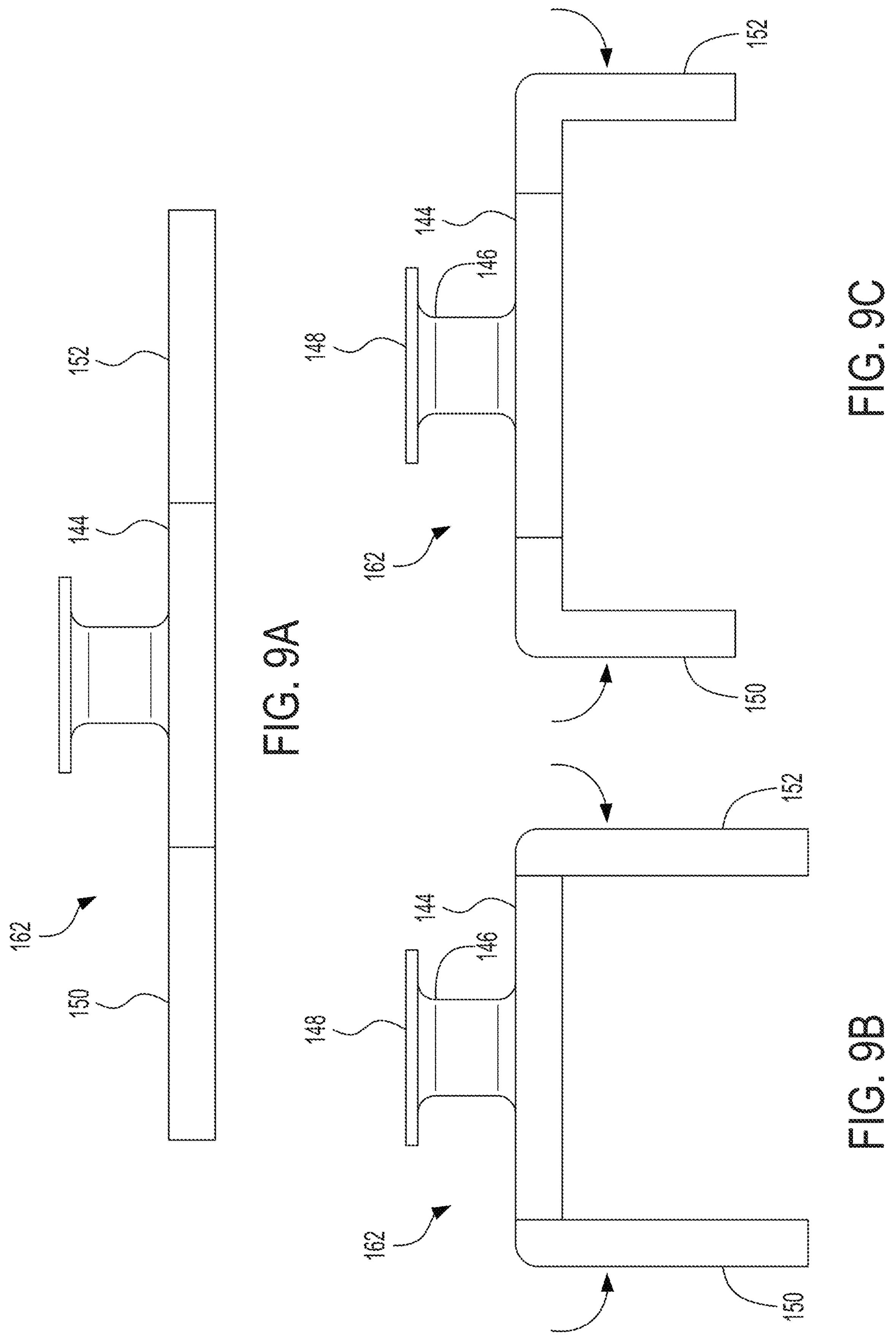
FIG. 9A is a side view of a preform of the hardpoint connector of FIG. 5.
FIG. 9B is a side view of the preform of the hardpoint connector of FIG. 9A after bending a first leg and a second leg to accommodate a chassis rail having a first width.
FIG. 9C is a side view of the preform of the hardpoint connector of FIG. 9A after bending the first leg and the second leg to accommodate a chassis rail having a second width.

At block 204, the method 200 continues by providing the chassis 110 of the vehicle 100. More specifically, the cargo body 116 is provided with the first longitudinal rail 112 and the second longitudinal rail 112. The method 200 continues at block 206 by providing the hardpoint connector 136. For example and referring to FIG. 9A, the hardpoint connector 136 may initially be formed, more specifically, cast, as a preform 162 having the first leg 150 and the second leg 152 in the same plane as the base 144. Referring to FIG. 9B, the first leg 150 and the second leg 152 may then be bent relative to the base 144 such that the first leg 150 and the second leg 152 extend away from the neck 146 and the head 148 of the connector 136. As shown in FIGS. 9B and 9C, the first leg 150 and the second leg 152 may be bent at various locations to accommodate chassis rails of various widths, as shown by the different distances between legs 150 and 152 in FIGS. 9B and 9C. At block 208, the method 200 continues by coupling the head 148 and neck 146 of the hardpoint connector 136 to the floor of the cargo body 116. More specifically, the head 148 and neck 146 of the connector 136 may be positioned in the lower cavity 140 of the floor 118, and the lower cavity 140 may be filled, via the base apertures 154 and 156, with the adhesive 142. Upon curing, the adhesive 142 secures the hardpoint connector 136 to the floor 118 of the cargo body 116. At block 210, the method 200 concludes by coupling the first leg 150 and the second leg 152 of the hardpoint connector 136 to the chassis rail 112. More specifically, the connector 136 and the cargo body 116 are positioned such that the chassis rail 112 is disposed between the first leg 150 and the second leg 152, and the fastener 138 is extended through the first leg aperture 158, the chassis rail 112, and the second leg aperture 160.

The method 200 can be modified in various manners. For example, the hardpoint connector 136 may be embedded in the composite floor 118 before coupling one or more layers of the floor 118 to one or more other layers of the floor 118.

Figure 10A:
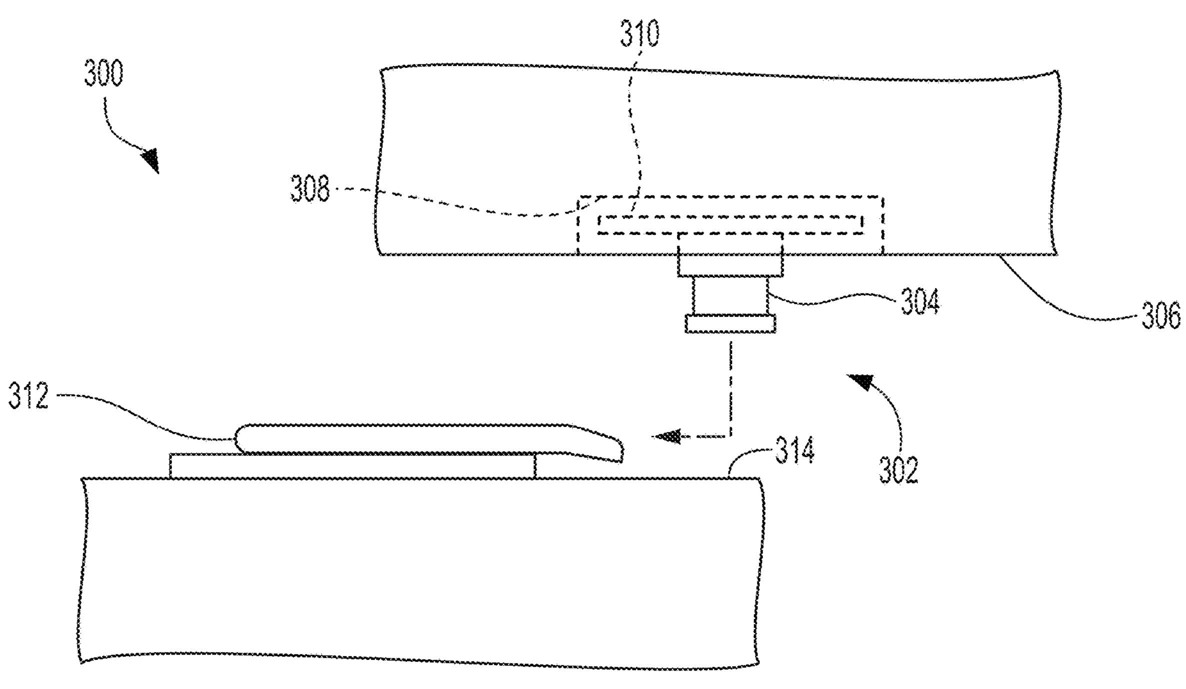
FIG. 10A is a side view of a mounting assembly for coupling a cargo body to a chassis of a vehicle before connecting a kingpin to a saddle.
Figure 10B:
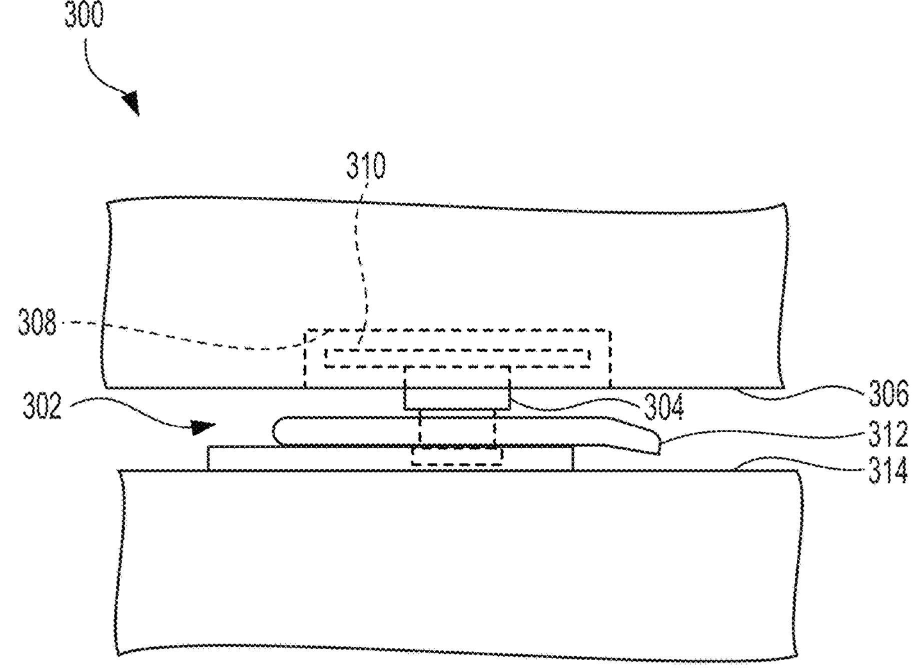
FIG. 10B is a side view of the mounting assembly of FIG. 10A after connecting the kingpin to the saddle.

Connections between a composite floor of a cargo body of a vehicle and a chassis of the vehicle may take other forms. For example and referring to FIGS. 10A and 10B, a connection 300 includes one or more mounting assemblies 302 provided along the length of a vehicle (for example, the vehicle 100 (FIG. 1)). Each mounting assembly 302 includes a kingpin 304 that is partially embedded in a composite floor 306 of the vehicle. More specifically, the kingpin 304 is partially received in a lower cavity 308 of the floor 306 and secured to the floor 306 by an adhesive 310 that is also disposed in the lower cavity 308. The exposed end of the kingpin 304 is received by a saddle 312 coupled to a longitudinal rail 314 of the chassis of the vehicle. The saddle 312 may be mechanically or integrally coupled to the longitudinal rail 314 by fasteners and/or adhesives.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo vehicle comprising:
- a chassis comprising a longitudinal rail coupled to a motorized truck;
- a cargo body coupled to the chassis and including a floor for supporting cargo;
- a hardpoint connector coupling the longitudinal rail of the chassis to the floor of the cargo body, the hardpoint connector comprising:
  - a base;
  - a neck coupled to the base;
  - a head coupled to the neck opposite the base, the head being embedded in the floor of the cargo body;
  - a first leg coupled to the base and extending opposite the neck; and
  - a second leg coupled to the base and extending opposite the neck.

2. The cargo vehicle of claim 1, wherein the floor of the cargo body comprises a lower cavity, wherein the head of the hardpoint connector is disposed in the lower cavity of the floor, and further comprising an adhesive disposed in the lower cavity of the floor and coupling the floor to the head of the hardpoint connector.

3. The cargo vehicle of claim 1, wherein the hardpoint connector receives the longitudinal rail between the first leg and the second leg.

4. The cargo vehicle of claim 1, wherein the head of the hardpoint connector comprises a circular disk shape.

5. The cargo vehicle of claim 1, wherein the base of the hardpoint connector comprises a circular disk shape.

6. The cargo vehicle of claim 5, wherein the head of the hardpoint connector comprises a circular disk shape.

7. The cargo vehicle of claim 6, wherein the head of the hardpoint connector comprises a first diameter, the base comprises a second diameter, the second diameter being greater than the first diameter.

8. The cargo vehicle of claim 1, wherein the base, the first leg, and the second leg of the hardpoint connector define an inverted U-shape when view from a side of the hardpoint connector.

9. The cargo vehicle of claim 1, further comprising a fastener received by and coupling the first leg and the second leg of the hardpoint connector to the longitudinal rail of the chassis.

10. The cargo vehicle of claim 9, wherein the first leg of the hardpoint connector comprises a first leg aperture receiving the fastener, and the second leg of the hardpoint connector comprises a second leg aperture receiving the fastener.

11. The cargo vehicle of claim 1, wherein the base of the hardpoint connector comprises a base aperture, and further comprising an adhesive disposed in the base aperture.

12. The cargo vehicle of claim 1, wherein the hardpoint connector is a first hardpoint connector, and further comprising a second hardpoint connector coupling the longitudinal rail of the chassis to the floor of the cargo body.

13. The cargo vehicle of claim 1, wherein the longitudinal rail of the chassis is a first longitudinal rail, the chassis further comprises a second longitudinal rail, the hardpoint connector is a first hardpoint connector, and further comprising a second hardpoint connector coupling the second longitudinal rail of the chassis to the floor of the cargo body.

14. A cargo vehicle comprising:
- a chassis coupled to a motorized truck and comprising a longitudinal rail;
- a cargo body coupled to the chassis and including a floor for supporting cargo;
- a hardpoint connector coupling the longitudinal rail of the chassis to the floor of the cargo body, the hardpoint connector comprising:
  - an inverted U-bolt portion coupled to the longitudinal rail of the chassis; and a stationary capstan portion coupled to the floor of the cargo body.

15. The cargo vehicle of claim 14, further comprising a fastener received by and coupling the inverted U-bolt portion of the hardpoint connector to the longitudinal rail of the chassis.

16. The cargo vehicle of claim 14, wherein the floor of the cargo body comprises a lower cavity, wherein the stationary capstan portion of the hardpoint connector is disposed in the lower cavity of the floor, and further comprising an adhesive disposed in the lower cavity of the floor and coupling the floor to the stationary capstan portion of the hardpoint connector.

17. The cargo vehicle of claim 14, wherein the inverted U-bolt portion of the hardpoint connector comprises a first leg and a second leg, and the hardpoint connector receives the longitudinal rail between the first leg and the second leg.

18. The cargo vehicle of claim 14, wherein the stationary capstan portion of the hardpoint connector comprises head, the head comprising a circular disk shape.

19. The cargo vehicle of claim 14, wherein the inverted U-bolt portion of the hardpoint connector comprises a base, the base comprising a circular disk shape.

20. The cargo vehicle of claim 19, wherein the stationary capstan portion of the hardpoint connector comprises head, the head comprising a circular disk shape.

21. The cargo vehicle of claim 20, wherein the head of the hardpoint connector comprises a first diameter, the base comprises a second diameter, the second diameter being greater than the first diameter.

22. A method for coupling a chassis rail of a vehicle to a lower surface of a composite floor of a cargo body of the vehicle, the method comprising:

providing a hardpoint connector, the hardpoint connector comprising a base, a neck coupled to the base, a head coupled to the neck opposite the base, a first leg coupled to the base and extending opposite the neck, and a second leg coupled to the base and extending opposite the neck;

embedding the head of the hardpoint connector in the composite floor of the cargo body of the vehicle; and coupling the first leg and the second leg of the hardpoint connector to the chassis rail.

23. The method of claim 22, wherein providing the hardpoint connector comprises bending the first leg and the second leg of the hardpoint connector relative to the base of the hardpoint connector.

24. The method of claim 22, further comprising forming the floor of the cargo body from a plurality of layers before embedding the head of the hardpoint connector in the floor of the cargo body of the vehicle.

25. The method of claim 22, wherein the base of the hardpoint connector comprises a base aperture and the floor of the cargo body comprises a lower cavity, and embedding the head of the hardpoint connector in the floor of the cargo body of the vehicle comprises injecting an adhesive through the base aperture and into the lower cavity.

* * * * *